April 21, 1959     A. BERNSTEIN     2,883,176
ACCELEROMETER
Filed Feb. 10, 1958
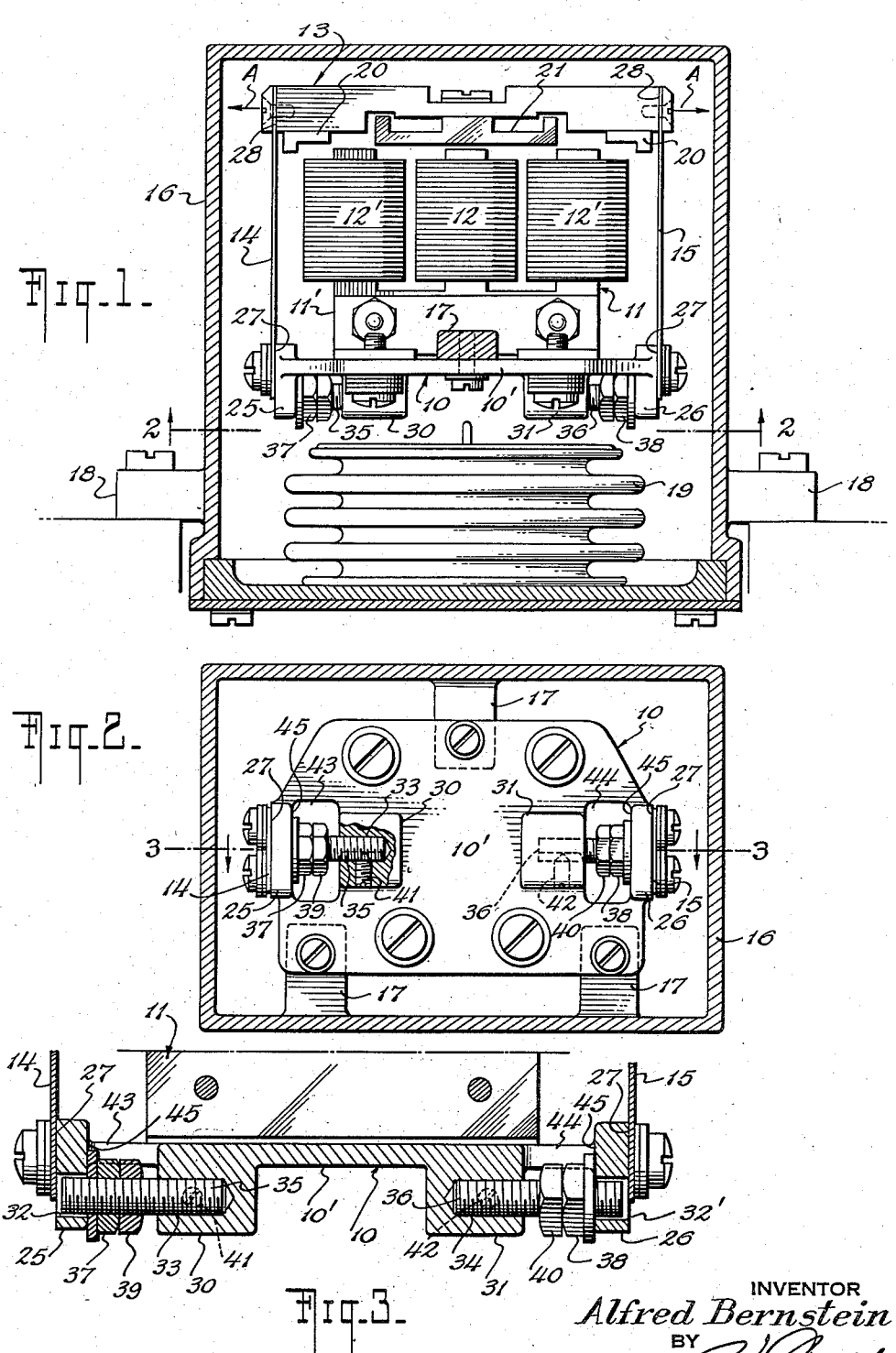
INVENTOR
*Alfred Bernstein*
BY
ATTORNEY

United States Patent Office 2,883,176
Patented Apr. 21, 1959

2,883,176

ACCELEROMETER

Alfred Bernstein, New Hyde Park, N.Y., assignor to Sperry Rand Corporation, a corporation of Delaware Application February 10, 1958, Serial No. 714,328

3 Claims. (Cl. 264—1)

The present invention relates generally to accelerometers and, more specifically, to a signal producing accelerometer of the type in which the acceleration-sensitive or seismic mass is supported by flat or leaf springs and to means for compensating for mechanical misalignments in such support which would otherwise be effective to produce a signal output in the absence of accelerations acting on the seismic mass.

In copending application S.N. 675,650, filed August 1, 1957, in the name of Ernest C. Wittke, entitled Transformer Pick-Off, there is shown an accelerometer of the same type as herein disclosed. The invention disclosed in this copending application is directed to the compensation of electrical unbalances in the instrument after the sealing thereof. The invention disclosed in the present application is directed to the compensation of mechanical unbalances or misalignments before the sealing thereof.

In accelerometers of the character disclosed in the present application, it is desired that the seismic or acceleration-sensitive mass be supported in such a way that it is responsive only to accelerations along a sensitive axis along which the acceleration to be detected and measured occurs, the support being such as to render the seismic mass unresponsive to forces or components of forces which act in a direction normal to or laterally of that sensitive axis. Generally, the accelerometer of the present invention comprises a base to which is fixed an E transformer constituting the stator of an inductive pick-off device for providing a signal in accordance with the acceleration to be detected. The seismic mass is preferably an elongated bar and constitutes, at least in part, the armature of the inductive pick-off and is supported from the base by means of a pair of flat spring members, each having one end thereof rigidly secured to opposite ends of the base and the other end thereof rigidly secured to opposite ends of the seismic mass, the E transformer preferably being located on the base between the flat spring supports for compactness but which need not be so located.

The thin strip material from which the flat springs are cut is often supplied and/or stored in a rolled-up condition so that the flat springs may have an initial bend in them difficult, if not impossible, to completely remove. Also, during assembling of the accelerometer or in manually atempting to straighten the initial curvature of the springs, they may become further bent. In any event, after assembly, the springs may not be, and seldom are, truly flat. Such out-of-flatness of the springs may result in a signal from the energized accelerometer even though the mass is not subjected to any acceleration force at all as will be described below. Since this force is produced primarily as a result of transformer energization, it will vary with any variations in the source of electrical energy.

It has been found that, due to the energization of the E transformer, a force is imposed upon the seismic mass, which force is effective in a direction normal to or laterally of the sensitive axis of the accelerometer. If, for example, the two flat springs are bent so that their columnal support force is not perfectly aligned with or parallel to the energization or solenoidal force produced by the energized E transformer, a resultant force or variation of force will be produced which will have a component directed along the sensitive axis of the instrument and will, therefore, produce a movement of the armature or mass along that axis with the result that a signal will be generated under a zero acceleration condition of the instrument.

The present invention provides a means by which the support force provided by the flat spring members may be adjusted in a direction and to an amount such that it is precisely aligned with or parallel to the energization force produced by the energized E transformer on the sensitive element or seismic mass and therefore precisely counteracts such energization force.

It is, therefore, a principal object of the present invention to provide an improved accelerometer incorporating means for nulling out any signal under zero acceleration conditions due to mechanical stresses acting on the seismic mass support members.

It is another object of the present invention to provide an improved accelerometer which eliminates any movement of the seismic mass along its sensitive axis due to mechanical misalignment of the support members by adjusting the angular relation between these support members and the base of the accelerometer.

Other objects and advantages of the present invention will become clearly apparent in the following description of a preferred embodiment of the invention when read in the light of the accompanying drawings, wherein:

Fig. 1 is an elevational view, partly in section, of an accelerometer embodying the principles of the present invention;

Fig. 2 is a bottom elevational view, partly in section, taken along the line 2—2 of Fig. 1; and Fig. 3 is a partial section, somewhat enlarged, of the accelerometer taken along the line 3—3 of Fig. 2.

In the drawings, the accelerometer of the present invention comprises generally a base 10, an E pick-off transformer 11 having suitable energization windings 12 and pick-up windings 12', and an elongated seismic mass 13 which may carry or be an integral part of an armature cooperable with the E transformer 11. The seismic mass 13 is supported from said base by means of two flat, cantilever springs 14 and 15, each having one end thereof fixed to a portion of the base 10 and the other end thereof fixed to the ends of the seismic mass 13. It will be apparent that the flat springs 14 and 15 supporting the mass 13 are so constructed and arranged as to permit the mass 13 to move relatively freely along a longitudinal axis A constrained only by the spring action which tends to return the mass to its initial position. The longitudinal axis A is referred to as the sensitive axis. Also, such movement will produce an electrical signal in the pick-up or output windings of the stator 11 having a phase and magnitude dependent upon the direction and amount of such movement in a conventional fashion for this type of transducer. This entire accelerometer assembly may be supported within a housing 16 as by means of suitable brackets 17. The housing 16 may be supported on a vehicle, the acceleration of which it is desired to detect as by suitable lugs 18. It will be understood that the housing is so positioned on the vehicle that the sensitive axis A of the accelerometer lies in the direction of the acceleration of the vehicle to which it is desired to respond. The entire housing may, if desired, be filled with a suitable damping fluid such as, for example, silicon, to thereby provide damping of the accelerometer to accelerations out of the frequency range which it is desired to detect. A bellows 19 is provided for permitting expansion and contraction of the damping fluid under varying temperature conditions.

In the illustrated embodiment of the present invention, the E transformer is rigidly secured to the base 10 by means of suitable L-shaped brackets 11' attached to each side of the transformer and to the base plate 10 as by means of suitable screws and nuts. Also, in order to limit the maximum travel of the armature or mass 13 relative to the stator 11, suitable limit stops 20 are provided on the mass which cooperate with the outer poles of the E-shaped stator. In the illustrated embodiment, the seismic mass 13 includes as a separate element an armature 21 which is secured to the mass by means of suitable screws.

The base 10, while being a single element or casting, may be considered to be composed of three portions, a rigid mid portion 10' which supports stator 11 and two end portions 25, 26, each of which projects downwardly from the platform 10 so as to provide a large flat spring-mounting area 27 which is normally precisely at right angles to the surface of the platform 10 to which the stator 11 is secured. The flat springs 14 and 15 are each secured to these flat areas 27 as by means of suitable machine screws and lock washers so that when the screws are tight the flat ends extend from the end portions 25 at right angles to the platform 10. The elongated seismic mass 13 is also provided with flat end portions 28 and provides a mounting surface for the other ends of each of the flat springs 14 and 15 which are rigidly secured thereto as by means of clamping plates and machine screws.

Thus, if perfect flatness of the springs 14 and 15 is assumed and the springs are precisely at right angles to the base plate 10, each spring acts as a column to supply a support force for the seismic mass. Also, with the same assumption, if the E transformer is energized with no acceleration force acting on the mass 13, the columnar support supplied by the springs is precisely parallel to any force produced on the mass 13 by the alternating current energization of the transformer 11. Thus, the springs and mass are so relatively arranged that the ends of the armature 21 lie symmetrically disposed between the outer legs of the E transformer, and since the gaps between the ends of the armature 21 and the E transformer legs are equal, the reluctance of the magnetic path formed by the transformer legs and armature will be equal and no signal will be generated in the output windings of the transformer 11. However, due to the energization of the transformer, the force produced on the armature 21 and hence the mass 13 is in a lateral direction, i.e., normal to the sensitive axis A, but with the above assumption that the flat springs 14 and 15 were perfectly flat and that the angles they made with the base were precisely 90 degrees, these lateral forces are opposed by an equal and opposite support or columnal force provided by the flat springs.

As stated above, it may not be possible to achieve perfect flatness of the springs 14 and 15 or perfect normalcy between the flat faces of base end portions 25 and base mid portion 10'. If such condition is not achieved the support force provided by the flat springs may not be perfectly parallel to the force produced by the energization or variation of the energization of the E transformer, and if these two lateral forces are not perfectly parallel a resultant force will be produced which will have a component directed along the sensitive axis A, and hence when no acceleraton forces are applied to the seismic mass 13 a signal output will be generated as a result of the movement of the mass 13 in response to such resultant force.

In accordance with the present invention, means are provided for effectively achieving parallelism between the columnar support force provided by the springs 14 and 15 and any lateral force imposed on the seismic mass by the energization or variation in the energization of the E transformer. For this purpose, the base 10 is provided with a pair of bosses 30 and 31 which may form part of the base casting and which extend downwardly from the base 10 substantially the same amount as the end portions 25, 26 of the base. Each of the projecting end portions 25, 26 of the base 10 is provided with preferably smooth walled holes 32, 32' and each of the bosses 30, 31 are provided with substantially collinear tapped holes 33, 34. A pair of threaded studs 35, 36 are screwed into the tapped holes 33, 34 and bottom at the respective ends thereof. A pair of adjusting nuts 37, 38 and a pair of locknuts 39 and 40 are threaded onto the screws 35, 36. Preferably, each screw is provided with a V-notch such that it may be rigidly clamped against rotation relative to the bosses 30, 31 as by means of set screws 41, 42. Thus, the threaded studs 35 become an integral part of the base 10. It will be noted that the free ends of the threaded studs 35, 36 terminate closely adjacent the flanges 25, 26, i.e., extend freely into the holes or bores 32, 33 to a point short of the flat surfaces 27. Thus, the bores 32, 33 in flanges or end portions 25, 26 are slightly larger than the external threaded diameter of the screws 35, 36 so that relative motion between the end portions of the screws 35, 36 is permitted.

As shown clearly in Fig. 2, the base 10 has been cut away between the bosses 30, 31 and the end portions 25, 26 as at 43, 44, leaving throats or reduced area connections 45 between the base 10 and the end portions 25, 26. These reduced area portions of the base 10 render the end portions 25, 26 flexible, that is, capable of a flexing movement relative to the base 10.

Now assume that after assembly the accelerometer is positioned so as not to be subject to any accelerations along its sensitive axis and the E transformer is energized; but also that upon such energization (or change in energization) a finite output signal or static error signal is observed to exist. Under this condition, the resultant lateral or columnal support force produced by the springs 14 and 15 may not be perfectly aligned with the lateral energization force acting on the armature 21 and seismic mass 13 and therefore a resultant force will exist which will move the seismic mass in the direction of the sensitive or longitudinal axis A. To align these two forces and thereby reduce the static error signal, either or both of the nuts 37, 38 are turned on their respective studs in a direction such as to cause the base of the nuts to abut the depending flanges or end portions 25, 26. Continued rotation of the nuts will thereby result in a deformation or deflection of the base portions 25 or 26 relative to the mid portion 10' of the base 10 to thereby change the angular relation between the flat surfaces 27 of the end portions 25, 26 and the plate of the base 10. Such adjustment is continued until the error signal is reduced to zero, at which time the resultant columnar force supplied by the springs 14 and 15 is precisely aligned with the solenoidal force produced by energization of the transformer winding 12. Locknuts 39 and 40 are then screwed up tight against the adjusting nuts 37, 38 thereby maintaining the adjustment and insuring no further movement between the end portions 25, 26 relative to the base 10. Inasmuch as an adjusting means is provided at each end of the base 10, each capable of adjustment in opposite senses, adjustment of the mass 13 in either direction may be made.

Therefore, it is clear that what is required in an accelerometer of the foregoing character is that upon energization of the pick-off winding or windings any solenoidal force tending to move the seismic mass in a direction normal to the sensitive axis is exactly opposed by an equal and opposite mass support force since, if these two forces were not perfectly parallel, a resultant force in a direction of the sensitive axis will exist and therefore a movement of the seismic mass along the sensitive axis will occur with a resultant static error signal. By the present invention, means are provided for adjusting the resultant support force for the seismic mass such that it can be perfectly aligned with any solenoidal force produced by the energization (or variation in energization) of the pick-off winding, thereby insuring that no force along the sensitive axis will exist and therefore no static error signal will be generated.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An accelerometer comprising a base having a rigid mid portion and flexible end portions, a mass, a pair of flat cantilever springs, one end of each spring being rigidly secured to said end portions of said base and the other end of each spring being rigidly secured to end portions of said mass whereby said mass is capable of constrained longitudinal movement relative to said base under the influence of acceleration forces acting thereon, an E transformer mounted on the mid portion of said base and located between said springs, and said mass constituting, at least in part, a movable armature cooperable with said transformer, and means for energizing said transformer whereby upon movement of said armature a signal will be produced in accordance with such movement, said energizing means also producing a lateral force between said transformer and armature whereby if said springs are misaligned with respect to said force under zero acceleration conditions, a longitudinal movement of said mass will result producing a consequent unwanted signal, and means coupled between said base mid portion and said flexible base portions for adjustably biasing the angular relation therebetween whereby to adjust the angular orientation of said springs relative to said lateral force.

2. An accelerometer comprising a base having a rigid portion and a flexible portion, a mass constituting, at least in part, a movable armature, a flat cantilever spring, one end thereof being rigidly secured to said flexible portion of said base and the other end thereof being rigidly secured to said mass, an E transformer mounted relative to said base and mass such that longitudinal movement of said mass relative to said transformer will upon energization or variation of energization of said transformer produce a signal in accordance with such movement, such energization also producing a lateral force between said transformer and mass whereby if said springs are misaligned with respect to said force under zero acceleration conditions, a longitudinal movement of said mass will result producing a consequent unwanted signal, means for compensating for said misalignment including a threaded stud having one end rigidly secured in said base and the other end free and terminating closely adjacent said flexible base portion, and a nut on said threaded stud adapted upon turning thereof to be caused to abut said base end portion and thereby flex it relative to the rigid portion of said base whereby to adjust the orientation of said spring relative to said lateral force to an extent to reduce any misalignment therebetween to zero.

3. An accelerometer comprising a base having a rigid mid portion and flexible end portions, a mass, a pair of flat cantilever springs, one end of each spring being rigidly secured to said end portions of said base and the other end of each spring being rigidly secured to end portions of said mass whereby said mass is capable of constrained longitudinal movement relative to said base under the influence of acceleration forces acting thereon, an E transformer mounted on the mid portion of said base and located between said springs, and said mass constituting, at least in part, a movable armature cooperable with said transformer, means for electrically energizing said transformer whereby upon movement of said armature an electrical signal will be produced in accordance with such movement, said energizing means also producing lateral forces between said transformer and armature whereby if said springs are misaligned with respect to said force under zero acceleration conditions, a longitudinal movement of said mass will result thereby producing a consequent unwanted signal, a pair of threaded studs each having one end rigidly secured in the mid portion of said base and the other end free and terminating closely adjacent said flexible base portions, and a nut on each of said threaded studs adapted upon turning thereof to be caused to forcibly abut said base end portions and thereby flex them relative to the mid portion of said base whereby to adjust the orientation of said spring relative to said lateral force and thereby to reduce any misalignment therebetween to zero.

No references cited.